United States Patent
Oami

(10) Patent No.: US 12,406,529 B2
(45) Date of Patent: Sep. 2, 2025

(54) DETERMINING COSMETIC LENS CANDIDATES THAT ARE COSMETIC LENSES

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 18/007,790

(22) PCT Filed: Jun. 5, 2020

(86) PCT No.: PCT/JP2020/022378
§ 371 (c)(1),
(2) Date: Dec. 2, 2022

(87) PCT Pub. No.: WO2021/245932
PCT Pub. Date: Dec. 9, 2021

(65) Prior Publication Data
US 2023/0245497 A1    Aug. 3, 2023

(51) Int. Cl.
*G06V 40/18* (2022.01)
*G06T 7/33* (2017.01)

(52) U.S. Cl.
CPC ............ *G06V 40/193* (2022.01); *G06T 7/337* (2017.01); *G06V 40/197* (2022.01); *G06V 2201/03* (2022.01)

(58) Field of Classification Search
CPC .. G06V 40/18; G06V 40/197; G06V 2201/03; G06V 40/193; G06V 40/1365; G06V 40/172; G06T 7/337
See application file for complete search history.

(56) References Cited

U.S. PATENT DOCUMENTS

| | | |
|---|---|---|
| 2018/0218212 A1 | 8/2018 | Yoshikawa et al. |
| 2019/0019026 A1 | 1/2019 | Jarosz et al. |
| 2019/0347483 A1 | 11/2019 | Krichen et al. |
| 2020/0167452 A1* | 5/2020 | Zhou ............... G06F 21/40 |
| 2020/0184186 A1 | 6/2020 | Inoue et al. |
| 2020/0305706 A1* | 10/2020 | Amil Marletti ......... G06T 5/70 |

FOREIGN PATENT DOCUMENTS

| | | |
|---|---|---|
| JP | 2002-279402 A | 9/2002 |
| JP | 2018-124733 A | 8/2018 |
| WO | 2019/044944 A1 | 3/2019 |

OTHER PUBLICATIONS

Doyle, James S., and Kevin W. Bowyer. "Robust detection of textured contact lenses in iris recognition using BSIF." IEEE Access 3 (2015): 1672-1683. (Year: 2015).*
International Search Report for PCT Application No. PCT/JP2020/022378, mailed on Sep. 1, 2020.

* cited by examiner

*Primary Examiner* — Sumati Lefkowitz
*Assistant Examiner* — Connor L Hansen

(57) ABSTRACT

An information processing device detects iris images of cosmetic lenses. A candidate extraction means extracts different iris images corresponding to the same person to be a cosmetic lens candidate. A confidence level calculation means matches iris features of the cosmetic lens candidate with iris features of other cosmetic lenses, and calculates a confidence level indicating a cosmetic lens likelihood. A determination means determines that the cosmetic lens candidate is a cosmetic lens with respect to the calculated confidence level that is equal to or higher than a predetermined threshold value.

6 Claims, 11 Drawing Sheets

<FACIAL IMAGE DB>

| PERSON ID | FACIAL IMAGE | FACIAL FEATURES |
|---|---|---|
| 001 | A00001 | B00001 |
| 002 | A00002 | B00002 |
| 003 | A00003 | B00003 |
| . | . | ... |
| . | . | ... |

FIG. 4A

<IRIS IMAGE DB>

| PERSON ID | IRIS IMAGE | IRIS FEATURES |
|---|---|---|
| 001 | C00001 | D00001 |
| 002 | C00002 | D00002 |
| 003 | C00003 | D00003 |
| . | . | ... |
| . | . | ... |

FIG. 4B

<COSMETIC LENS CANDIDATE DB>

| CANDIDATE ID | IRIS IMAGE | IRIS FEATURES | CONFIDENCE LEVEL |
|---|---|---|---|
| 001 | C00425 | D00425 | 24 |
| 002 | C00586 | D00586 | 8 |
| 003 | C01256 | D01256 | 43 |
| . | . | ... | . |
| . | . | ... | . |

FIG. 5A

<COSMETIC LENS DB>

| COSMETIC LENS ID | IRIS IMAGE | IRIS FEATURES |
|---|---|---|
| 001 | C00425 | D00425 |
| 002 | C01256 | D01256 |
| 003 | C02246 | D02246 |
| . | . | ... |
| . | . | ... |

FIG. 5B

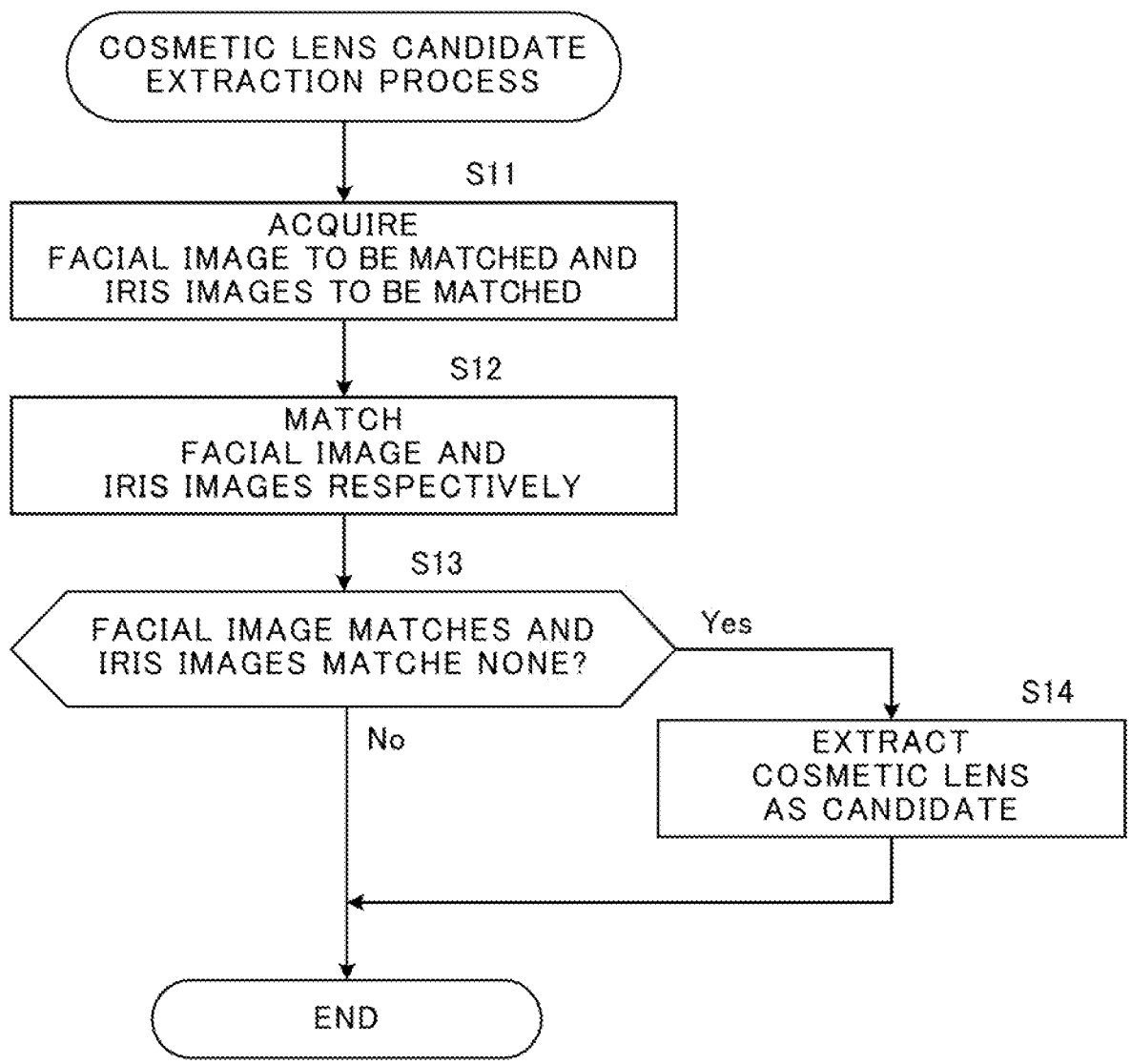

DETERMINING COSMETIC LENS CANDIDATES THAT ARE COSMETIC LENSES

This application is a National Stage Entry of PCT/JP2020/022378 filed on Jun. 5, 2020, the contents of all of which are incorporated herein by reference, in their entirety.

TECHNICAL FIELD

The present disclosure relates to a process of iris images.

BACKGROUND ART

An iris authentication is known as one of biometric authentications. In general, in the iris authentication, an iris pattern of a subject person is registered in a database, and an iris pattern acquired from the subject person at a time of the authentication is compared with the iris pattern registered in the database to perform the authentication.

Recently, the number of users using colored contact lenses has been increasing, especially among young people. In a case where colored contact lenses are worn, the iris pattern obtained from the subject person is affected by a pattern of the colored contact lenses. Therefore, in a case where the iris authentication is performed while colored contact lenses cannot be detected and iris patterns of persons wearing the similar colored contact lenses match with each other, there is a possibility that different persons may be erroneously determined as the same person, and some kind of countermeasure is needed.

In this regard, Patent Document 1 describes a method for determining that a user wears colored contact lenses in a case where a pattern of an iris area is uniform or repeats a predetermined pattern. Moreover, Patent Document 2 describes a method for extracting feature data from each colored contact lens and creating a dictionary of colored contact lenses.

PRECEDING TECHNICAL REFERENCES

Patent Document

Patent Document 1: Japanese Laid-open Patent Publication No. 2018-124733
Patent Document 2: Japanese Laid-open Patent Publication No. 2002-279402

SUMMARY

Problem to be Solved

However, a method disclosed in Patent Document 1 can only detect a colored contact lens having a uniform pattern or a repetitive pattern. The method of Patent Document 2 requires a dedicated device for generating feature data from the colored contact lens, and the device is expensive. Also, in recent years, types of colored contact lenses are varied, and it is not realistic to read and register sets of feature data for a large number of colored contact lenses one by one with the dedicated device as described above.

It is one object of the present disclosure to provide an information processing device capable of creating a database of iris images of cosmetic lenses such as colored contact lenses or the like, by using registered iris data.

Means for Solving the Problem

According to an example aspect of the present disclosure, there is provided an information processing device including:

a candidate extraction means configured to extract different iris images corresponding to the same person to be a cosmetic lens candidate;

a confidence level calculation means configured to match iris features of the cosmetic lens candidate with iris features of other cosmetic lenses, and calculate a confidence level indicating a cosmetic lens likelihood; and a determination means configured to determine that the cosmetic lens candidate is a cosmetic lens with respect to the calculated confidence level that is equal to or higher than a predetermined threshold value.

According to another example aspect of the present disclosure, there is provided an information processing method, including:

extracting different iris images corresponding to the same person to be a cosmetic lens candidate;

matching iris features of the cosmetic lens candidate with iris features of other cosmetic lenses, and calculating a confidence level indicating a cosmetic lens likelihood; and determining that the cosmetic lens candidate is a cosmetic lens with respect to the calculated confidence level that is equal to or higher than a predetermined threshold value.

According to still another example aspect of the present disclosure, there is provided a recording medium storing a program, the program causing a computer to perform a process including:

extracting different iris images corresponding to the same person to be a cosmetic lens candidate;

matching iris features of the cosmetic lens candidate with iris features of other cosmetic lenses, and calculating a confidence level indicating a cosmetic lens likelihood; and determining that the cosmetic lens candidate is a cosmetic lens with respect to the calculated confidence level that is equal to or higher than a predetermined threshold value.

BRIEF DESCRIPTION OF THE DRAWINGS

FIG. 4A and FIG. 4B illustrate examples of a facial image database and an iris image database.

FIG. 5A and FIG. 5B illustrate examples of a cosmetic lens candidate database and cosmetic lens database.

FIG. 6 is a flowchart of a cosmetic lens candidate extraction process.

EXAMPLE EMBODIMENTS

In the following, preferable example embodiments in this disclosure will be described with reference to the accompanying drawings.

Cosmetic Lens

The following example embodiments detect each iris image of a cosmetic lens, and register the detected iris image in a database. The "cosmetic lens" is a type of contact lens which changes a pattern of the iris image when worn, and corresponds to a so-called colored contact lens, and a contact lens called "circle lens" which have an effect of making an eye look bigger by applying a donut shaped border to the lens.

First Example Embodiment

Overall Configuration

Figure 1:
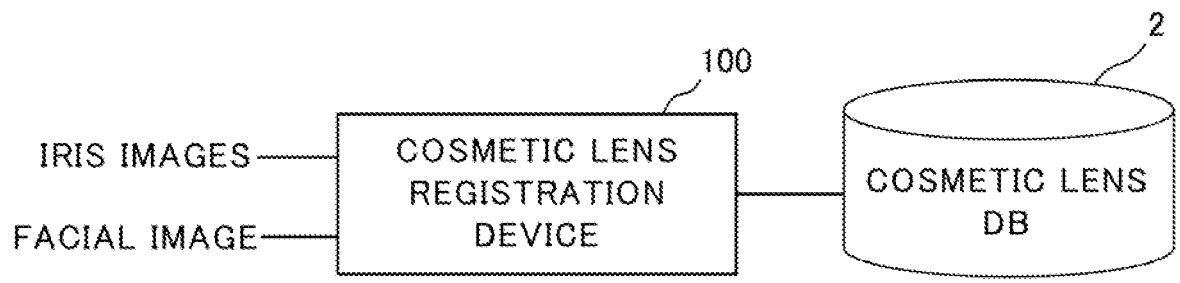
FIG. 1 illustrates an overall configuration of a cosmetic lens registration device according to a first example embodiment.

FIG. 1 illustrates an overall configuration of a cosmetic lens registration device according to a first example embodiment. The cosmetic lens registration device (hereinafter, simply referred to as "registration device") 100 inputs each set of a pair of iris images and a facial image, and registers the set in a cosmetic lens database (hereinafter, a "database" is referred to as a "DB") 2. At that time, using the set of the pair of iris images and the facial image, the registration device 100 determines whether or not each of the iris images is an iris image (hereinafter, also referred to as a "cosmetic lens iris image") with the cosmetic lenses attached. The registration device 100 registers, in the cosmetic lens DB 2, at least either the iris image determined to be the cosmetic lens iris image or features (hereinafter, referred to as "iris features") of the iris image. The iris image or the iris features of the cosmetic lens registered in the cosmetic lens DB 2 are used for an iris authentication using the iris images.

Hardware Configuration

Figure 2:
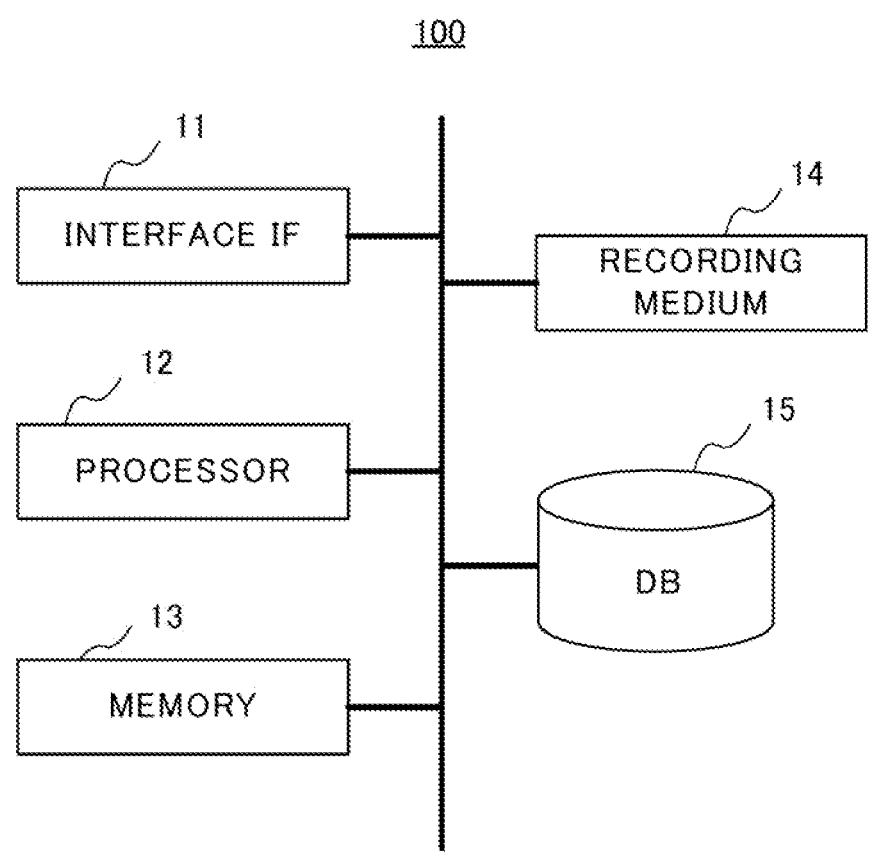
FIG. 2 illustrates a hardware configuration of the cosmetic lens registration device.

FIG. 2 is a block diagram illustrating a hardware configuration of the registration device 100. As illustrated, the registration device 100 includes an interface (IF) 11, a processor 12, a memory 13, a recording medium 14, and a database (DB) 15).

The IF 11 inputs and outputs data to and from an external device. Specifically, the set of the iris images and the facial image obtained from the subject person are input to the registration device 100 through the IF 11. In addition, the iris images which are determined as the cosmetic lenses and the iris features by the registration device 100 are output to the cosmetic lens DB 2 through the IF 11.

The processor 12 is a computer such as a CPU (Central Processing Unit) and controls the entire registration device 100 by executing programs prepared in advance. Incidentally, the processor 12 may correspond to one or more processors including a GPU (Graphics Processing Unit) or a FPGA (Field-Programmable Gate Array). Specifically, the processor 12 executes a cosmetic lens candidate extraction process, a cosmetic lens registration process, and the like.

The memory 13 is formed by a ROM (Read Only Memory), a RAM (Random Access Memory), and the like. The memory 13 is also used as a working memory during executions of various processes by the processor 12.

The recording medium 14 is a non-volatile and non-transitory recording medium such as a disk-shaped recording medium or a semiconductor memory, and is formed to be detachable from the registration device 100. The recording medium 14 records various programs executed by the processor 12. When the registration device 100 executes various kinds of processes, programs recorded on the recording medium 14 are loaded into the memory 13 and executed by the processor 12.

The database 15 temporarily stores sets of the iris images and the facial image input through the IF 11, and the iris images determined by the registration device 100 as the cosmetic lenses and the iris features thereof. That is, the registration device 100 may include a keyboard, an input section such as a mouse, and a display section such as a liquid crystal display for performing instructions and inputs by an administrator or the like.

Function Configuration

Figure 3:
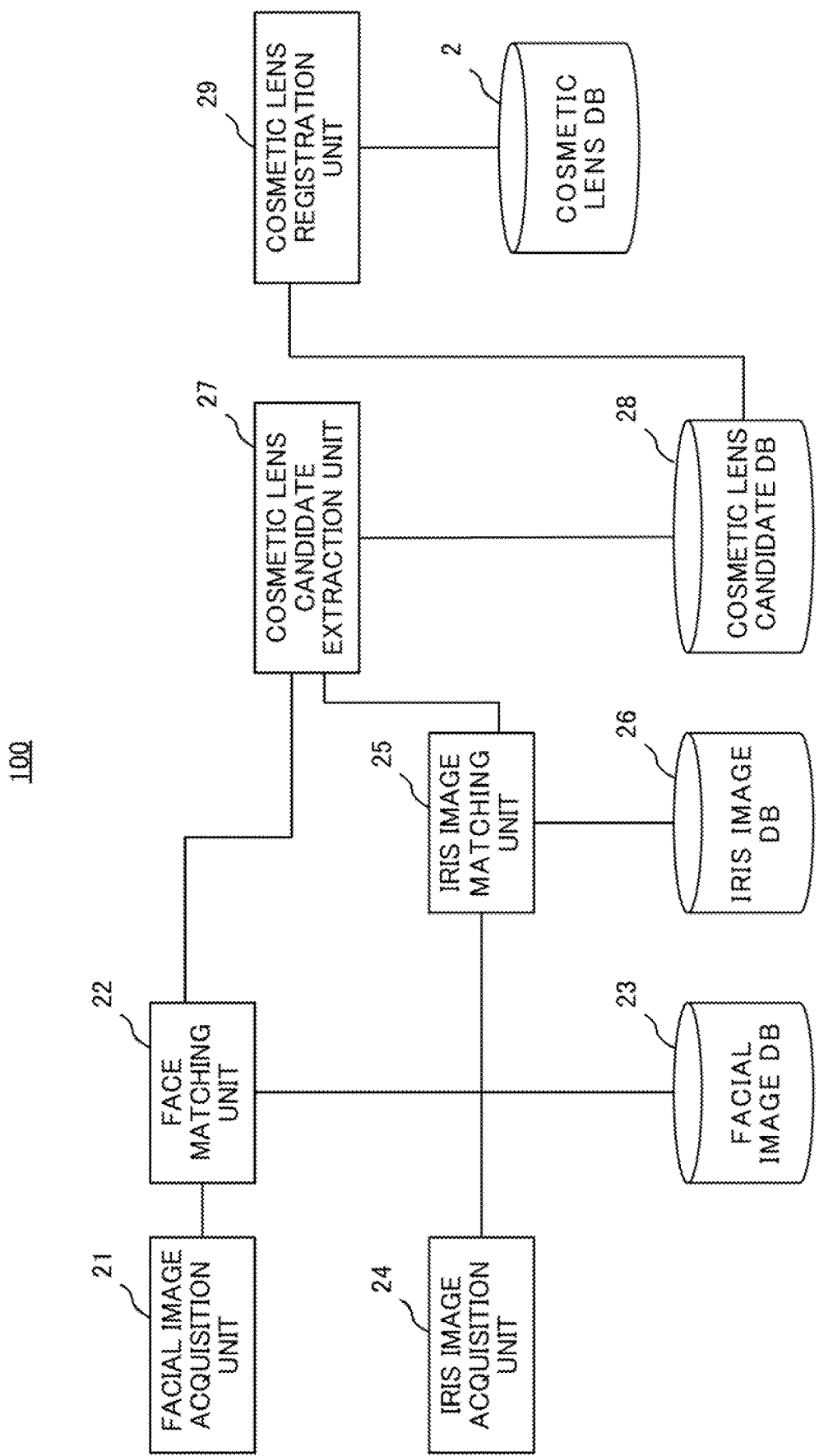
FIG. 3 illustrates a functional configuration of the cosmetic lens registration device.

FIG. 3 is a block diagram illustrating a functional configuration of the registration device 100. The registration device 100 includes a facial image acquisition unit 21, a face matching unit 22, a facial image DB 23, an iris image acquisition unit 24, an iris matching unit 25, an iris image DB 26, a cosmetic lens candidate extraction unit 27, a cosmetic lens candidate DB 28, and a cosmetic lens registration unit 29.

The facial image acquisition unit 21 acquires a facial image of a subject person (hereinafter, also referred to as a "target facial image"). Specifically, the facial image acquisition unit 21 acquires, as the target facial image, a captured image by a camera or the like which captures a face of the subject person. Instead, the facial image acquisition unit 21 may acquire the target facial image from a database or the like in which facial images captured in advance are stored. The facial image acquisition unit 21 outputs the acquired target facial image to the face matching unit 22.

The facial image DB 23 stores facial images and features thereof (hereinafter, referred to as "facial features") for a plurality of persons. FIG. 4A illustrates an example of stored data in the facial image DB 23. The facial image DB 23 stores a person ID, the facial image, and the facial features. Here, "the person ID" is identification information of each person, and each "facial image" corresponds to data of the facial image which captures a face of a person. In addition, the "facial features" correspond to data of features extracted from the facial image. Note that the facial image is not necessarily required, and only the facial features may be stored.

The face matching unit 22 extracts the facial features from the target facial image acquired from the facial image acquisition unit 21, and matches the facial features with a plurality of facial features registered in the facial image DB 23. Specifically, the face matching unit 22 calculates a degree of matching or a degree of similarity between the facial features of the target facial image and the facial features registered in the facial image DB 23, and compares a score (hereinafter, referred to as "matching score") with a predetermined first threshold value. With respect to the matching score that is equal to or greater than the first threshold value, the face matching unit 22 determines that the target facial image matches the registered facial image, and with respect to the matching score that is lower than the first threshold value, the face matching unit 22 determines that the target facial image and the registered facial image are not matched. After that, the face matching unit 22 outputs a matching result to the cosmetic lens candidate extraction unit 27.

The iris image acquisition unit 24 acquires iris images (hereinafter, also referred to as "target iris images") of the subject person. Incidentally, the iris images acquired by the iris image acquisition unit 24 and the facial image acquired by the facial image acquisition unit 21 are of the same subject person. Specifically, the iris image acquisition unit 24 is connected to an iris camera or the like which captures a portion of pupils of the subject person by infrared rays, and acquires captured images by the iris camera as the target iris images. Instead, the iris image acquisition unit 24 may acquire the target iris images from a database or the like in which the iris images captured in advance using the iris camera are stored. The iris image acquisition unit 24 outputs the acquired target iris images to the iris matching unit 25.

The iris image DB 26 stores the iris images and the iris features for a plurality of persons. FIG. 4B illustrates an example of the stored data of the iris image DB 26. The iris image DB 26 stores the person ID, the iris images, and the iris features. Here, the "person ID" is the identification information of a person, and the "iris images" correspond to data of images which captures respective irises of the person, that is, each doughnut shaped portion between a pupil and a white eye. The "iris features" are also data of features extracted from the iris images. Hereinafter, the iris images and the iris features are collectively referred to as "iris data".

The iris matching unit 25 extracts the iris features from the target iris images acquired from the iris image acquisition unit 24, and matches the extracted iris features with a plurality of iris features registered in the iris image DB 26. Specifically, the iris matching unit 25 calculates a degree of matching or a degree of similarity between the iris features of the target iris images and the iris features registered in the iris image DB 26, and compares the matching score with a predetermined second threshold value. With respect to the matching score that is equal to or greater than the second threshold value, the iris matching unit 25 determines that the target iris images match the registered iris images, and with respect to the matching score that is lower than the second threshold value, the iris matching unit 25 determines that the target iris images do not match the registered iris images. After that, the iris matching unit 25 outputs a matching result to the cosmetic lens candidate extraction unit 27.

The cosmetic lens candidate acquisition unit 27 extracts cosmetic lens candidates based on the matching result of the face matching unit 22 and the matching result of the iris matching unit 25. Specifically, the cosmetic lens candidate acquisition unit 27 extracts, as a cosmetic lens candidate, iris images in a case where the face is determined to match by a face matching and irises are determined to match none by an iris matching. Since the facial image which is determined to match by the face matching unit 22 is of the same person, the iris data are registered in the iris image DB 26 for the subject person. On the other hand, in a case where the irises are determined to be no match by the iris matching unit 25, this case indicates that the iris data matching the target iris images acquired by the iris image acquisition unit 24 are not registered in the iris image DB 26. That is, the iris data already registered in the iris image DB 26 for the subject person are different from the iris data of the target iris image. This means that there are a plurality of sets of iris data for that subject person; however, since a plurality of iris patterns for the same person do not exist, at least one of two pairs of the iris images which are determined to match none is inferred to be a pair of cosmetic lens iris images.

Therefore, the cosmetic lens candidate extraction unit 27 outputs the target iris images to the cosmetic lens candidate DB 28 as the cosmetic lens candidate in a case where the matching results of the facial image and the iris images fall under a condition that "the face matches and the irises match none". Note that in a case where the matching result of the facial image and the matching result of the iris images do not fall under the condition that "the face matches and the irises match none", the target iris images are not extracted as the cosmetic lens candidate.

The cosmetic lens candidate DB 28 stores iris data of the cosmetic lens candidate extracted by the cosmetic lens candidate extraction unit 27. FIG. 5A illustrates an example of data stored in the cosmetic lens candidates DB 28. The cosmetic lens candidate DB 28 stores a candidate ID, the iris images, the iris features, and a confidence level. The "candidate ID" is identification information provided to each cosmetic lens candidate. The "iris images" correspond to data of iris images of cosmetic lens candidate, and the "iris features" correspond to data of features extracted from the iris images. The "confidence level" is an index that indicates a cosmetic lens likelihood for each cosmetic lens candidate. That is, the confidence level indicates a possibility that the cosmetic lens candidate is actually cosmetic lenses, and the greater the confidence level, the more likely the candidate is a cosmetic lens. The confidence level is calculated by the cosmetic lens registration unit 29 which will be described below.

The cosmetic lens registration unit 29 selects a cosmetic lens from the cosmetic lens candidates stored in the cosmetic lens candidate DB 28, and registers the selected cosmetic lens to the cosmetic lens DB 2. Specifically, the cosmetic lens registration unit 29 selects one cosmetic lens candidate (hereinafter, referred to as a "target cosmetic lens candidate") to be registered from the cosmetic lens candidate DB 28 and another cosmetic lens candidate to match with the selected cosmetic lens candidate, and matches the iris features thereof. When the matching score obtained by the matching is equal to or greater than a predetermined third threshold value, the cosmetic lens registration unit 29 determines that the two cosmetic lens candidates are matched. Next, the cosmetic lens registration unit 29 selects another cosmetic lens candidate, and similarly performs the matching with the target cosmetic lens candidate. Accordingly, the cosmetic lens registration unit 29 matches the target cosmetic lens candidate with all other cosmetic lens candidates, and calculates, as the confidence level, a frequency that the matching result indicates a candidate match. In a real world, since many peoples sometimes use cosmetic lenses of the same brand, it can be said that the larger a matched frequency by the matching, the more likely that the iris images are the cosmetic lens iris images. Therefore, the cosmetic lens registration unit 29 uses the matched frequency as the confidence level. Incidentally, this matched frequency indicates the number of other cosmetic lens candidates that match with respective target cosmetic lens candidates. The other cosmetic lens candidates may be represented by iris features extracted from the iris images of the subject person who has been captured previously and is to be verified.

Accordingly, in a case where the target cosmetic lens candidate is matched with all other cosmetic lens candidates and each confidence level is calculated, the cosmetic lens registration unit 29 determines whether each of the obtained confidence levels is equal to or higher than a predetermined fourth threshold value, and determines, as the cosmetic lens, a cosmetic lens candidate for which the confidence level is greater than the fourth threshold value. Next, the cosmetic lens registration unit 29 registers iris data of the iris images determined as the cosmetic lenses, in the DB 2 of the cosmetic lenses. The fourth threshold value in this example embodiment is an example of a predetermined threshold value.

FIG. 5B illustrates an example of data stored in the cosmetic lens DB 2. The cosmetic lens DB 2 stores a cosmetic lens ID, iris images, and iris features. The "cosmetic lens ID" indicates identification information provided to each pair of iris images which are determined to be cosmetic lenses by the cosmetic lens registration unit 29. The "iris images" correspond to data of the iris images of the cosmetic lenses, and the "iris features" correspond to data of features extracted from the iris images.

As described above, in a case where different iris images exist for the same person, the cosmetic lens registration device 100 of the present example embodiment first extracts the different iris images as the cosmetic lens candidate. Next, the cosmetic lens registration device 100 matches iris features of the cosmetic lens candidates with each other, and sets the confidence level to be higher as the matched frequency, that is, the number of other cosmetic lens candidates being matched is greater. Next, the cosmetic lens registration device 100 determines, as the cosmetic lenses, a cosmetic lens candidate for which the confidence level is equal to or higher than a predetermined threshold value, and registers the cosmetic lens candidate in a database. Accordingly, it becomes possible for the cosmetic lens registration device 100 to detect the cosmetic lens iris images from a large number of iris images by combining the matching of the facial image and the matching of the iris image.

In the above configuration, the cosmetic lens candidate extraction unit 27 is an example of a candidate extraction means, the cosmetic lens registration unit 29 corresponds to examples of a confidence level calculation means, a determination means, and a registration means. Moreover, the facial image acquisition unit 21 is an example of a biological information acquisition means, the face matching unit 22 is an example of a biological information matching means, the iris image acquisition unit 24 is an example of an iris image acquisition means, and the iris matching unit 25 is an example of an iris matching means.

Processing Flow

Next, a flow of a process performed by the cosmetic lens registration device 100 will be described. The cosmetic lens registration device 100 first extracts the cosmetic lens candidates by performing a cosmetic lens candidate extraction process. Next, the cosmetic lens registration device 100 determines cosmetic lens from among a plurality of acquired cosmetic lens candidates, and registers the determined cosmetic lens in the cosmetic lens DB 2.

Cosmetic Lens Candidate Extraction Process

FIG. 6 is a flowchart of the cosmetic lens candidate extraction process. This process is implemented by the processor 12 depicted in FIG. 2, which executes a program prepared in advance and operates as each of elements depicted in FIG. 3.

First, the facial image acquisition unit 21 acquires the target facial image, and the iris image acquisition unit 24 acquires the target iris images (step S11). Next, the face matching unit 22 matches the facial features of the target facial image with the facial features stored in the facial image DB 23. Similarly, the iris matching unit 25 matches the iris features of the target iris images with the iris features stored in the iris image DB 26 (step S12).

Next, based on the matching result in the step S12, the cosmetic lens candidate extraction unit 27 determines whether or not the target facial image and the target iris images fall under the condition that "the facial image matches and the iris images match none" (step S13). When the target facial image and the target iris images fall under the above-described condition (step S13: Yes), the cosmetic lens candidate extraction unit 27 extracts the target iris images at that time as the cosmetic lens candidate, and stores the target iris images in the cosmetic lens candidate DB 28 (step S14). On the other hand, when the target facial image and the target iris images do not fall under the above described condition (step S13: No), the cosmetic lens candidate extraction process is terminated.

Accordingly, each time a facial image and iris images of a person are obtained, it is determined whether or not the iris images correspond to the cosmetic lens candidate, and when it is determined that the iris images correspond to the cosmetic lens candidate, the iris images are stored in the cosmetic lens candidate DB 28.

Cosmetic Lens Registration Process

Figure 7:
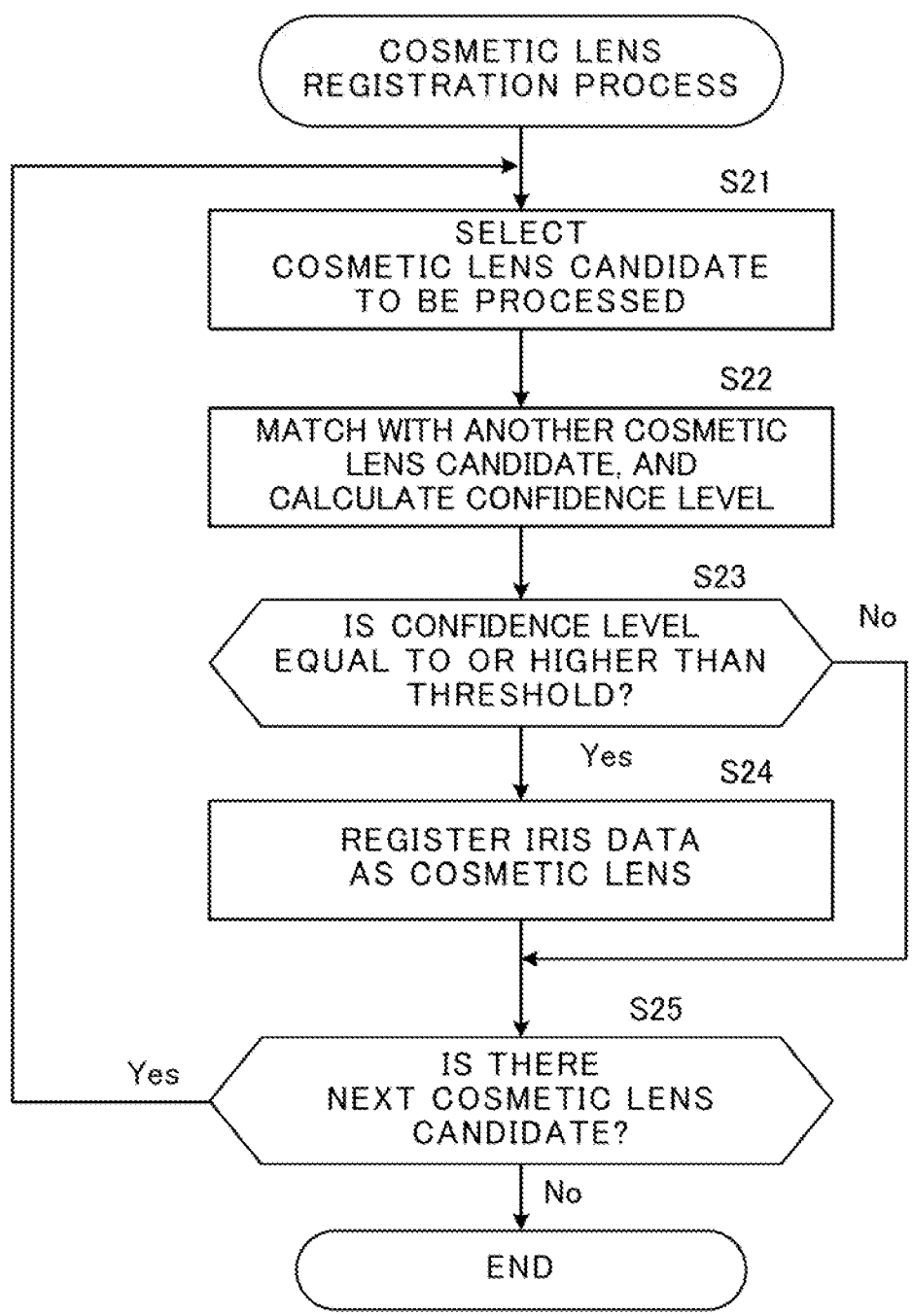
FIG. 7 is a flowchart of a cosmetic lens registration process.

FIG. 7 is a flowchart of the cosmetic lens registration process. This process is also implemented by the processor 12 depicted in FIG. 2, which executes a program prepared in advance and operates as each of elements depicted in FIG. 3.

First, the cosmetic lens registration unit 29 selects one target cosmetic lens candidate from the cosmetic lens candidate DB 28 (step S21). Next, the cosmetic lens registration unit 29 matches the iris features of the target cosmetic lens candidate with the iris features of all other cosmetic lens candidates stored in the cosmetic lens candidate DB 28, and calculates the matched frequency as the confidence level (step S22).

Next, the cosmetic lens registration unit 29 determines whether the obtained confidence level is equal to or higher than the fourth threshold value described above (step S23). When the confidence level is equal to or higher than the fourth threshold value (step S23: Yes), the cosmetic lens registration unit 29 determines the cosmetic lens candidate as the cosmetic lens, and registers the iris data in the cosmetic lens DB 2 (step S24). On the other hand, when the confidence level is lower than the fourth threshold value (step S23: No), the cosmetic lens registration process advances to step S25.

Next, the cosmetic lens registration unit 29 determines whether or not there is a next cosmetic lens candidate (step S25), and when there is the next cosmetic lens candidate, the cosmetic lens registration unit 29 sets the next cosmetic lens candidate as the target cosmetic lens candidate, and performs processes of steps S21 to S24. After that, when the cosmetic lens registration process is conducted for all the cosmetic lens candidates stored in the cosmetic lens candidate DB 28, the cosmetic lens registration process is terminated.

Modifications

Next, modifications of the first example embodiment will be described. The following modifications can be carried out in combination as appropriate.

First Modification

Figure 8A:
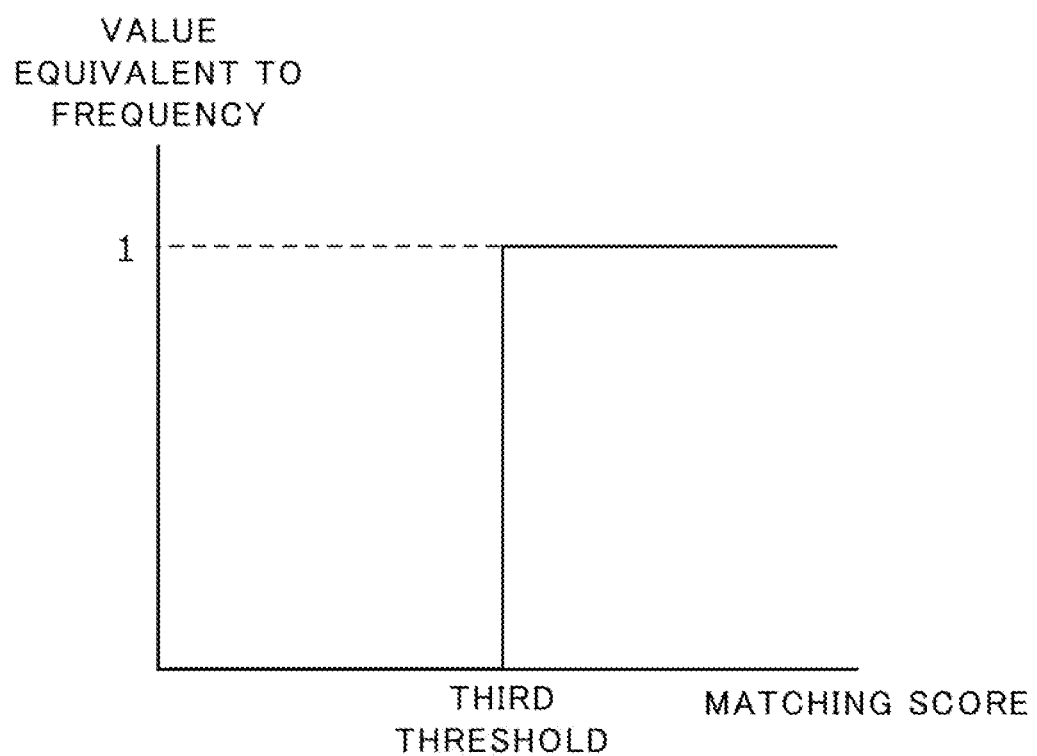
FIG. 8 illustrates an example of a confidence level calculation method.

In the above-described first example embodiment, the cosmetic lens registration unit 29 calculates the matched frequency of the iris features among the cosmetic lens candidates as the confidence level. Hereinafter, this method is referred to as a "first confidence level calculation method". FIG. 8A illustrates a function for calculating the confidence level in this case. When the matching score between the cosmetic lens candidates is equal to or greater than the third threshold value, the cosmetic lens registration unit 29 sets "matched" to the matching result, and adds "1" to the confidence level. Instead, the cosmetic lens registration unit 29 may calculate the confidence level by any of the following methods.

In a second confidence level calculation method, the cosmetic lens registration unit 29 sets a sum of the matching scores as the confidence level. That is, the first confidence level calculation method, whereas the confidence level is calculated by adding a result from comparing the matching score with a threshold value, the confidence level is calculated by adding the matching scores itself in the second confidence level calculation method.

Figure 8B:
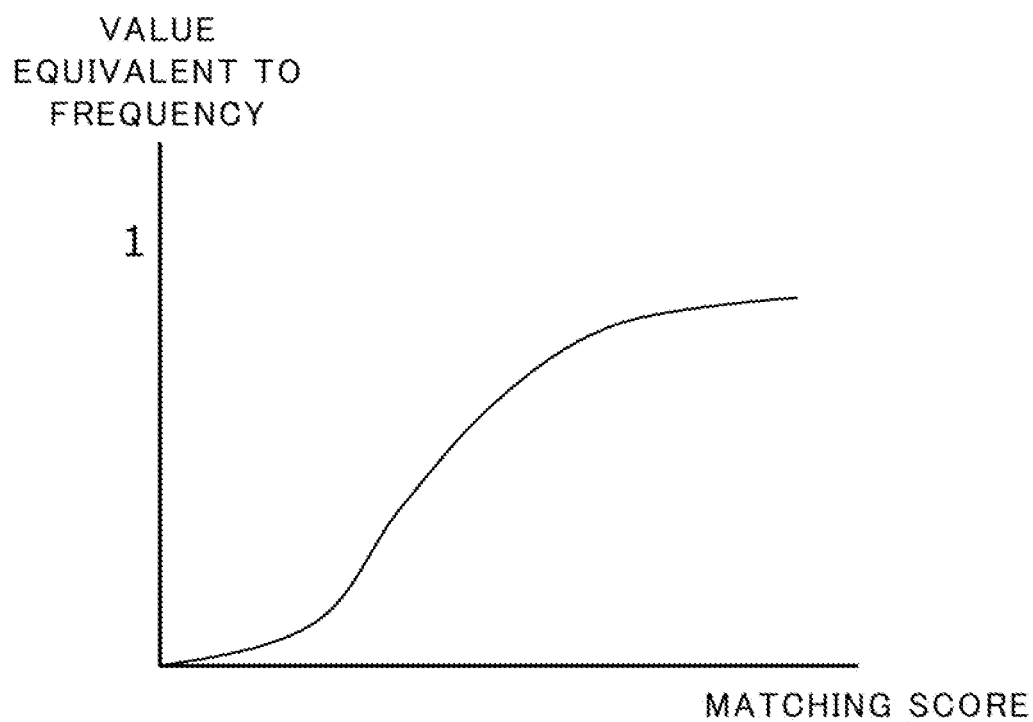

In a third confidence level calculation method, the cosmetic lens registration unit 29 calculates the confidence level by weighing and adding the matching scores. For instance, the cosmetic lens registration unit 29 converts each matching score into a value equivalent to the frequency by using the monotonically non-decreasing function illustrated in FIG. 8B, and calculates the confidence level by adding individual converted values.

Second Modification

In the above-described example embodiment, the cosmetic lens registration unit 29 registers the iris features of the cosmetic lens candidates determined to be the cosmetic lens as they are in the cosmetic lens DB 2 in step S24 of the cosmetic lens registration process illustrated in FIG. 7. Instead, the cosmetic lens registration unit 29 may integrate the iris images or iris features of other cosmetic lens candidates determined to be the same as the cosmetic lens candidate, and may register, in the cosmetic lens DB 2, an iris image (hereinafter, referred to as the "integrated iris image") obtained by the integration or the iris features (hereinafter, referred to as the "integrated iris features") obtained by the integration. Here, as the "other cosmetic lens candidates determined to be the same", for instance, a cosmetic lens candidate determined to match with the target cosmetic lens candidate by the matching of the iris features in step S22, or a cosmetic lens candidate in which the matching score with the target cosmetic lens candidate is equal to or greater than a predetermined value may be used.

(1) Case of Integrating the Iris Images

In this case, the cosmetic lens registration unit 29 relatively aligns the iris images of the target cosmetic lens candidate and the iris images of other cosmetic lens candidates determined to be similar to the target cosmetic lens candidate, and calculates a statistical value such as an average value or a median value of pixel values for each pair of iris images, and uses the calculated statistical value as a pixel value of the integrated iris image. Accordingly, by using statistics such as average values for a plurality of iris images determined to be similar, features of a portion other than a cosmetic lens are weakened by averaging or the like among patterns of the iris images, so that only features of a cosmetic lens portion remain. As a result, it becomes possible to weaken features of irises of a person wearing a pair of cosmetic lenses and to extract features of a pattern of the cosmetic lens itself more accurately.

(2) Case of Integrating Iris Features

In this case, the cosmetic lens registration unit 29 relatively aligns the iris features of the target cosmetic lens candidate with the iris features of the other cosmetic lens candidate determined to be similar to the target cosmetic lens candidate, matches the features while shifting an angle of an iris little by little, and finds a degree of displacement (angle) having a highest degree of matching. This results in correct alignment of two cosmetic lens candidates. When the alignment is completed in this manner, the cosmetic lens registration unit 29 calculates the statistical value such as the average value or the median value for each pair of iris features and uses the statistical value as the integrated iris features in the same manner as that in the case of integrating the iris images described above. Also in this case, it becomes possible to weaken the features of a pair of irises of a person wearing the pair of cosmetic lenses and extract the features of the pattern of the cosmetic lens itself more accurately.

Third Modification

In the above-described example embodiment, it is determined whether or not corresponding iris images are those of the same person by the matching of the face features by the face matching unit 22. Instead, a biometric authentication using other biological information such as fingerprint images, palmprint images, voice data of voices, vein pattern data, and otoacoustic data may be performed to determine whether or not a pair of iris images are of the same person. Instead of the facial image DB 23, a database may be used to store the biological information.

Iris Authentication Using Registered Data

The iris data of the cosmetic lens registered in the cosmetic lens DB 2 by the cosmetic lens registration process described above are used in a subsequent iris authentication process. In this case, in the iris authentication process, the iris data of cosmetic lenses are not used for the iris authentication in order to prevent an incorrect authentication. Specifically, the iris authentication device determines whether or not iris images to be verified is the cosmetic lens iris images by referring to the cosmetic lens DB 2, and for the iris images that are the cosmetic lens iris images, an authentication using the iris images is not performed.

Effect of the Present Example Embodiment

According to the configuration of the present example embodiment, in a case where different iris images exist for the same person, these iris images are extracted as the cosmetic lens candidates, so that the cosmetic lens iris images can be detected from a large number of iris images.

Therefore, it is possible to make a database concerning iris images of the cosmetic lenses by utilizing registered iris data.

Second Example Embodiment

Figure 9:
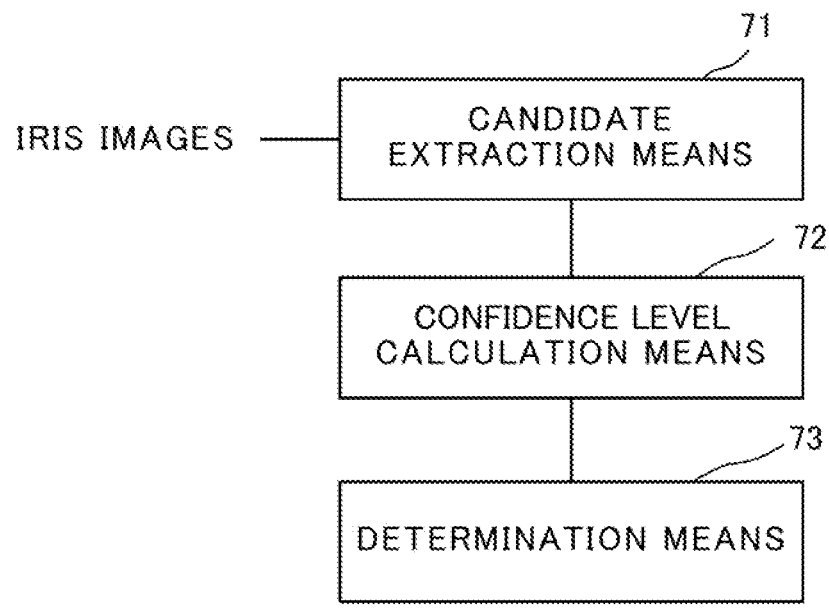
FIG. 9 illustrates a functional configuration of an information processing device according to a second example embodiment.

Next, a second example embodiment of this disclosure will be described. FIG. 9 is a block diagram illustrating a functional configuration of an information processing device according to the second example embodiment. An information processing device 70 includes a candidate extraction means 71, a confidence level calculation means 72, and a determination means 73. The candidate extraction means 71 extracts different iris images corresponding to the same person as the cosmetic lens candidates. The confidence level calculation means 72 compares the iris features of the cosmetic lens candidate with the iris features of each of other cosmetic lens candidates, and calculates each confidence level indicating the cosmetic lens likelihood based on the matching result. With respect to the calculated confidence level that is equal to or higher than a predetermined threshold value, the determination means 73 determines that cosmetic lens candidate as the cosmetic lens.

Figure 10:
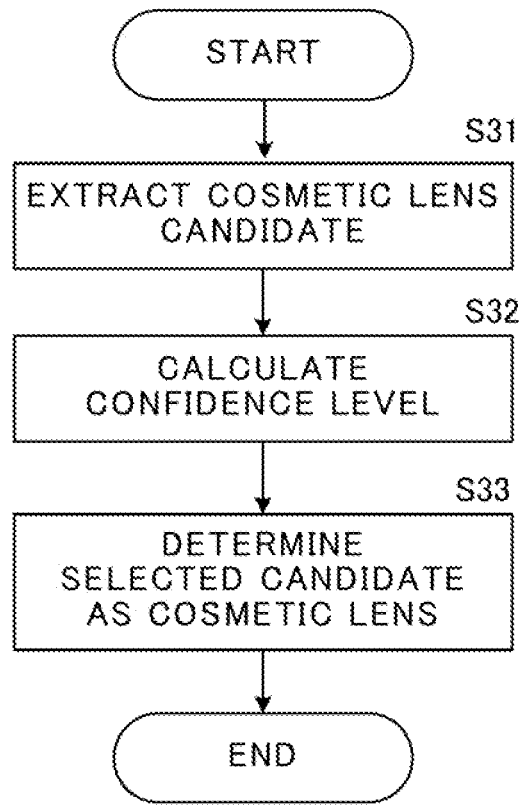
FIG. 10 is a flowchart of a process according to the second example embodiment.

FIG. 10 is a flowchart of a process according to the second example embodiment. This process is performed by each of elements of the information processing device 70. The candidate extraction means 71 extracts, as the cosmetic lens candidate, different iris images corresponding to the same person (step S31). The confidence level calculation means 72 compares the iris features of the cosmetic lens candidates with the iris features of the other cosmetic lens candidates, and calculates each confidence level indicating the cosmetic lens likelihood based on the matching result (step S32). When the calculated confidence level is equal to or higher than a predetermined threshold, the determination means 73 determines the cosmetic lens candidate as the cosmetic lens (step S33).

Effects of the Present Example Embodiment

According to the configuration of the present example embodiment, since the candidate extraction means 71 extracts different iris images corresponding to the same person to be cosmetic lens candidates, it is possible to efficiently extract cosmetic lens candidates from a large number of iris images. Since the confidence level calculation means 72 calculates the confidence level indicating the cosmetic lens likelihood based on the matching result from matching the iris features of the cosmetic lens candidate with other cosmetic lens candidates, the confidence level can be obtained for each cosmetic lens candidate. With respect to the confidence level that is equal to or higher than the predetermined threshold, since the determination means 73 determines that the cosmetic lens candidate is the cosmetic lens, it is possible to determine the cosmetic lens with high accuracy from among the cosmetic lens candidates.

Modifications

In the information processing device 70 according to a first modification of the second example embodiment, the candidate extraction means 71 acquires first biological information (first biological data) and second biological information (second biological data) from the same person. The confidence level calculation means 72 compares the second biological information (second biological data) which is acquired by the candidate extraction means 71 with third biological information (third biological data) which is acquired previously from another person. After that, based on a comparison result, the confidence level calculation means 72 calculates the confidence level indicating a likelihood that the second biological information (second biological data) acquired by the candidate extraction means 71 is fake (or not of biological origin). With respect to the calculated confidence level that is equal to or higher than the predetermined threshold value, the determination means 73 determines that the second biological information (second biological data) is fake (or not of biological origin).

In this modification, as an example of the first biological information (first biological data), facial features extracted from a facial image of a person using a neural network or the like are used. As an example of the second biological information (second biological data), iris features extracted from the iris images of the same person using a neural network or the like may be used. However, the first biological information (first biological data) and the second biological information (second biological data) may not be limited to the above examples, and may be any information based on physical characteristics of a person (that is, fingerprints, veins, pulses, a face, irises, retinas, pinna, ear canals, an electroencephalogram, a DNA, an appearance, and the like), or may be behavioral features of the person (that is, handwriting, typing, vocal prints, lip movements, blinking, a gait, and the like).

In another modification, the information processing device 70 may further include a registration means which stores the second biological information (second biological data) determined not to be derived from a living body in a database based on a determination result by the determination means 73.

In a further modification, the determination means 73 may determine whether or not a person falsifies the biological information, by comparing the matching result of the first biological information (first biological data) of the person with the matching result of the second biological information (second biological data) of the same person.

Third Example Embodiment

Figure 11:
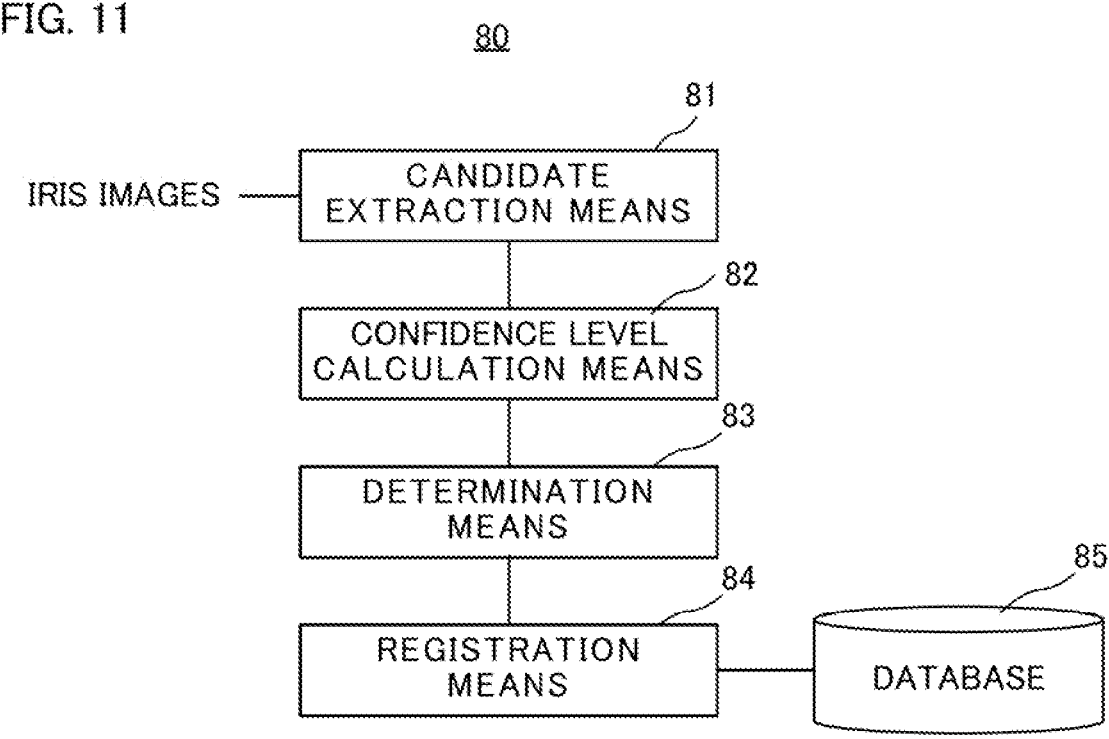
FIG. 11 illustrates a functional configuration of an information processing device according to a third example embodiment.

Next, a third example embodiment of this disclosure will be described. FIG. 11 is a block diagram illustrating a functional configuration of an information processing device according to the third example embodiment. An information processing device 80 includes a candidate extraction means 81, a confidence level calculation means 82, a determination means 83, a registration means 84, and a database 85. The candidate extraction means 81 extracts different iris images corresponding to the same person as cosmetic lens candidates. The confidence level calculation means 82 matches the iris features of the cosmetic lens candidate with the iris features of other cosmetic lens candidates, and calculates the confidence level indicating the cosmetic lens likelihood based on the matching result. With respect to the calculated confidence level that is equal to or higher than the predetermined threshold, the determination means 83 determines that the cosmetic lens candidate represents the cosmetic lens. The registration means 84 registers at least either the iris images determined to be the cosmetic lenses or the features of the iris images, in the database 85.

Figure 12:
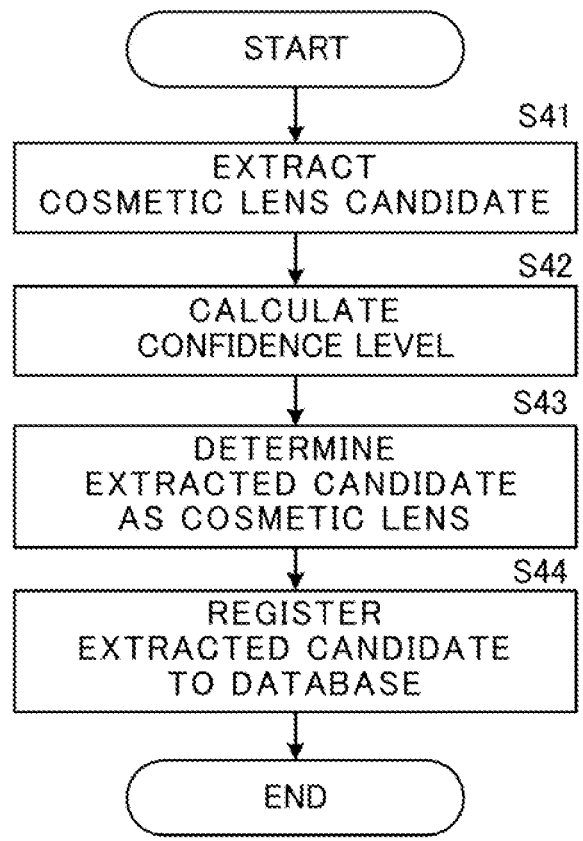
FIG. 12 is a flowchart of a process according to the third example embodiment.

FIG. 12 is a flowchart of a process according to the third example embodiment. This process is performed by elements of the information processing device 80. The candidate extraction means 81 extracts different iris images corresponding to the same person as the cosmetic lens candidates (step S41). The confidence level calculation means 82 compares the iris features of the cosmetic lens candidates with the iris features of the other cosmetic lens candidates, and calculates the confidence level indicating the cosmetic lens likelihood based on the matching result (step S42). With respect to the calculated confidence level the is equal to or higher than a predetermined threshold, the determination means 83 determines the cosmetic lens candidate as the cosmetic lens (step S43). The registration means 84 registers at least either the iris images determined to be the cosmetic lenses or the features of the iris images in the database 85 (step S44).

Effect of the Present Example Embodiment

According to the configuration of the present example embodiment, since the candidate extraction means 81 extracts different iris images corresponding to the same person as the cosmetic lens candidates, it is possible to efficiently extract cosmetic lens candidates from a large number of iris images. Since the confidence level calculation means 82 calculates the confidence level indicating the cosmetic lens likelihood based on the matching result of the iris features of the cosmetic lens candidate and the iris features of other cosmetic lens candidates, the confidence level can be obtained for each cosmetic lens candidate. With respect to the calculated confidence level that is equal to or higher than the predetermined threshold value, since the determination means 83 determines that the cosmetic lens candidate represents the cosmetic lens, it is possible to determine the cosmetic lens with high accuracy from among the cosmetic lens candidates. Since the registration means 84 registers at least either the iris images determined to be the cosmetic lenses or the features of the iris images in the database 85, the contact lens can be excluded at a time of authentication using the features of iris images or the iris images registered in the database 85.

Fourth Example Embodiment

Figure 13:
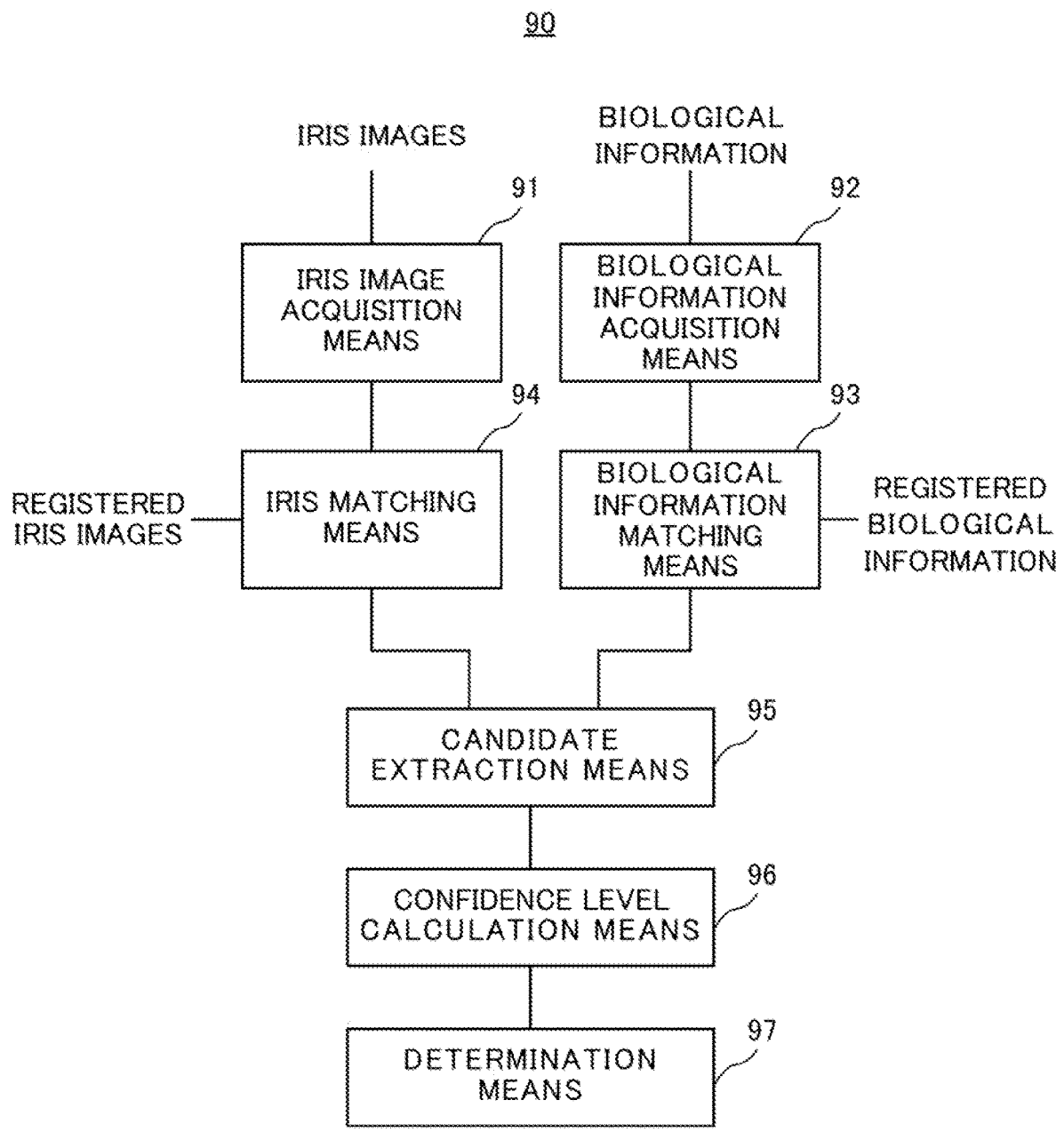
FIG. 13 illustrates a functional configuration of an information processing device according to a fourth example embodiment.

Next, a fourth example embodiment of this disclosure will be described. FIG. 13 is a block diagram illustrating a functional configuration of an information processing device according to the fourth example embodiment. An information processing device 90 includes an iris image acquisition means 91, a biological information acquisition means 92, a biological information matching means 93, an iris matching means 94, a candidate extraction means 95, a confidence level calculation means 96, and a determination means 97.

The iris image acquisition means 91 acquires iris images. The biological information acquisition means 92 acquires biological information corresponding to the iris images. The biological information matching means 93 matches the acquired biological information with the registered biological information. The iris matching means 94 matches the acquired iris images with the registered iris images. The candidate extraction means 95 extracts the iris images as the cosmetic lens candidate when the biological information matches and the iris images match none. The confidence level calculation means 96 matches the iris features of the cosmetic lens candidate with the iris features of the other cosmetic lens candidate, and calculates the confidence level indicating the cosmetic lens likelihood based on the matching result. With respect to the calculated confidence level that is equal to or higher than a predetermined threshold, the determination means 97 determines that the cosmetic lens candidate represents the cosmetic lens.

Figure 14:
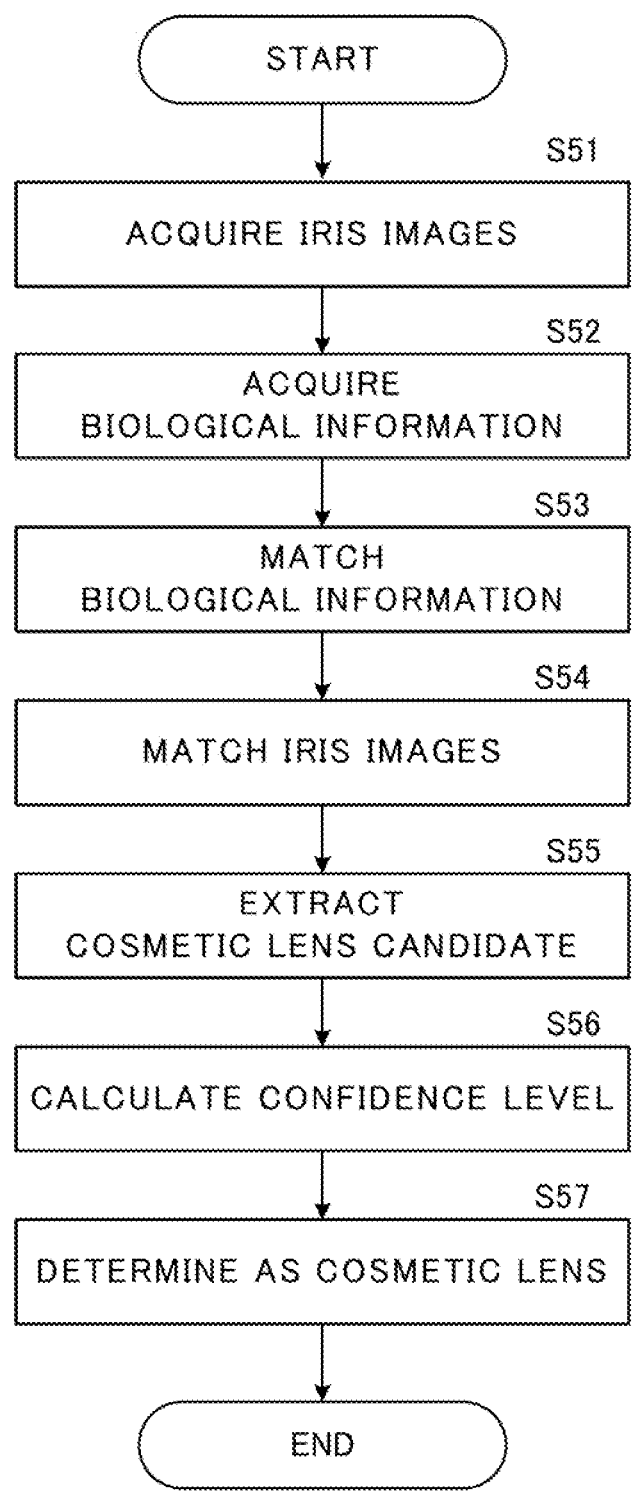
FIG. 14 a flowchart of a process according to the fourth example embodiment.

FIG. 14 is a flowchart of a process according to the fourth example embodiment. This process is performed by elements of the information processing device 90. The iris image acquisition means 91 acquires the iris images (step S51). The biological information acquisition means 92 acquires the biological information corresponding to the iris images (step S52). The biological information matching means 93 matches the acquired biological information with the registered biological information (step S53). The iris matching means 94 matches the acquired iris images with the registered iris images (step S54). The candidate extraction means 95 extracts the iris images as the cosmetic lens candidate when the biological information matches and the iris images match none (step S55). The confidence level calculation means 96 matches the iris features of the cosmetic lens candidates with the iris features of the other cosmetic lens candidates, and calculates the confidence level indicating the cosmetic lens likelihood based on the matching result (step S56). With respect to the calculated confidence level is equal to or higher than a predetermined threshold, the determination means 97 determines the cosmetic lens candidate as the cosmetic lens (step S57).

Effect of the Present Example Embodiment

According to the configuration of the present example embodiment, in a case where the biological information matches by the matching which the biological information matching means 93 performs and the iris images match none by the matching which the iris matching means 94 performs, the candidate extraction means 95 extracts the iris images as the cosmetic lens candidate. Therefore, it is possible to efficiently extract the cosmetic lens candidates from a large number of the iris images. Since the confidence level calculation means 96 calculates the confidence level indicating the cosmetic lens likelihood based on results from matching the iris features of the cosmetic lens candidate with the iris features of other cosmetic lens candidates, it is possible to acquire the confidence level for each cosmetic lens candidate. With respect to the calculated confidence level is equal to or higher than a predetermined threshold, since the determination means 97 determines the cosmetic lens candidate to be the cosmetic lens, it is possible to determine the cosmetic lens with high accuracy from among the cosmetic lens candidates.

A part or all of the example embodiments described above may also be described as the following supplementary notes, but not limited thereto.

Supplementary Note 1

1. An information processing device comprising:
a candidate extraction means configured to extract different iris images corresponding to the same person to be a cosmetic lens candidate;
a confidence level calculation means configured to match iris features of the cosmetic lens candidate with iris features of other cosmetic lenses, and calculate a confidence level indicating a cosmetic lens likelihood; and
a determination means configured to determine that the cosmetic lens candidate is a cosmetic lens with respect to the calculated confidence level that is equal to or higher than a predetermined threshold value.

Supplementary Note 2

2. The information processing device according to supplementary note 1, further comprising a registration means configured to register, in a database, either iris images determined as the cosmetic lenses or features of the iris images.

Supplementary Note 3

3. The information processing device according to supplementary note 1 or 2, further comprising
an iris image acquisition means configured to acquire iris images;
a biological information acquisition means configured to acquire biological information corresponding to the iris images;
a biological information matching means configured to match the acquired biological information with registered biological information; and
an iris matching means configured to match the acquired iris images with the registered iris images,
wherein the candidate extraction means extracts the iris images as the cosmetic lens candidate when the biological information match and the iris images match none.

Supplementary Note 4

4. The information processing device according to supplementary note 3, wherein the biological information includes at least one of a face image, a fingerprint image, a palmprint image, voice data, vein pattern data, and ear acoustic data.

Supplementary Note 5

5. The information processing device according to supplementary note 2, wherein the registration means integrates iris images of a plurality of cosmetic lens candidates based on a matching result, and registers, in the database, either the integrated iris image or the features extracted from the integrated iris image.

Supplementary Note 6

6. The information processing device according to supplementary note 5, wherein the registration means integrates the iris images by relatively aligning the iris images of the plurality of cosmetic lens candidates and calculating respective statistic values of pixel values of the iris images.

Supplementary Note 7

7. The information processing device according to supplementary note 2, wherein the registration means integrates features of iris images of a plurality of cosmetic lens candidates based on a matching result, and registers the integrated features in the database.

Supplementary Note 8

8. The information processing device according to supplementary note 7, wherein the registration means integrates the features of the iris images by relatively aligning the features of the iris images of the plurality of cosmetic lens candidates and calculating statistic values of the features.

Supplementary Note 9

9. The information processing device according to any one of supplementary notes 1 to 8, wherein the confidence level calculation means calculates, as the confidence level, either one of matched frequencies of the iris features by the matching, a sum of scores acquired by the matching, and a sum of values equivalent to the matched frequencies into which the scores are converted.

Supplementary Note 10

10. An information processing method, comprising:
extracting different iris images corresponding to the same person to be a cosmetic lens candidate;
matching iris features of the cosmetic lens candidate with iris features of other cosmetic lenses, and calculating a confidence level indicating a cosmetic lens likelihood; and
determining that the cosmetic lens candidate is a cosmetic lens with respect to the calculated confidence level that is equal to or higher than a predetermined threshold value.

Supplementary Note 11

11. A recording medium storing a program, the program causing a computer to perform a process comprising:
extracting different iris images corresponding to the same person to be a cosmetic lens candidate;
matching iris features of the cosmetic lens candidate with iris features of other cosmetic lenses, and calculating a confidence level indicating a cosmetic lens likelihood; and
determining that the cosmetic lens candidate is a cosmetic lens with respect to the calculated confidence level that is equal to or higher than a predetermined threshold value.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

2 Cosmetic lens DB
12 Processor
21 Facial image acquisition unit
22 Face matching unit
23 Face image DB
24 Iris image acquisition unit
25 Iris matching unit
26 Iris image DB
27 Cosmetic lens candidate extraction unit
28 Cosmetic lens candidate DB
29 Cosmetic lens registration unit
100 Cosmetic lens registration device

What is claimed is:
1. An information processing device comprising:
a memory storing instructions; and
one or more processors configured to execute the instructions to:
collect multiple cosmetic lens candidates by extracting iris images acquired from a person identical to a registered person and having different iris features from multiple persons as the cosmetic lens candidates;
match iris features of a number of cosmetic lens candidates of the multiple cosmetic lens candidates with iris features of other cosmetic lens candidates of the multiple cosmetic lens candidates, and calculate a frequency of match between each of the number of cosmetic lens candidates and the other cosmetic lens candidates as a confidence level indicating cosmetic lens likelihood;

determine that the number of cosmetic lens candidates are each a cosmetic lens in a case where the confidence level is equal to or higher than a predetermined threshold value;

relatively align the number of cosmetic lens candidates and the other cosmetic lens candidates, and calculate a statistical value of pixel values of each of a plurality of iris image pairs, where each iris image pair includes one of the number of cosmetic lens candidates and a corresponding matching one of the other cosmetic lens candidates; and register, in a database, at least one of the iris images determined as the cosmetic lens and features calculated using the statistical value of the pixel values of each iris image pair.

2. The information processing device according to claim 1, wherein the processor is further configured to
acquire the iris images;
acquire biological information corresponding to the iris images;
match the acquired biological information with registered biological information; and
match the iris images with the at least one of the iris images that have been registered in the database,
wherein the processor extracts the iris images as the multiple cosmetic lens candidate in a case where the biological information match and none of the iris images match.

3. The information processing device according to claim 2, wherein the biological information includes at least one of a face image, a fingerprint image, a palmprint image, voice data, vein pattern data, and ear acoustic data.

4. The information processing device according to claim 1, wherein the processor also calculates, as the confidence level, either or both of, a sum of matching scores between the iris features of the number of cosmetic lens candidates and the iris features of the other cosmetic lens candidates, and a weighted sum of the matching scores.

5. An information processing method performed by a computer and comprising:
collecting multiple cosmetic lens candidates by extracting iris images acquired from a person identical to a registered person and having different iris features from multiple persons as the cosmetic lens candidates;
matching iris features of a number of cosmetic lens candidates of the multiple cosmetic lens candidates with iris features of other cosmetic lens candidates of the multiple cosmetic lens candidates, and calculating a frequency of match between each of the number of cosmetic lens candidates and the other cosmetic lens candidates as a confidence level indicating cosmetic lens likelihood;

determining that the number of cosmetic lens candidates are each a cosmetic lens in a case where the confidence level is equal to or higher than a predetermined threshold value;

relatively align the number of cosmetic lens candidates and the other cosmetic lens candidates, and calculate a statistical value of pixel values of each of a plurality of iris image pairs, where each iris image pair includes one of the number of cosmetic lens candidates and a corresponding matching one of the other cosmetic lens candidates; and registering, in a database, at least one of the iris images determined as the cosmetic lens and features calculated using the statistical value of the pixel values of each iris image pair.

6. A non-transitory computer-readable recording medium storing a program executable by a computer to perform a process comprising:
collecting multiple cosmetic lens candidates by extracting iris images acquired from a person identical to a registered person and having different iris features from multiple persons as the cosmetic lens candidates;
matching iris features of a number of cosmetic lens candidates of the multiple cosmetic lens candidates with iris features of other cosmetic lens candidates of the multiple cosmetic lens candidates, and calculating a frequency of match between each of the number of cosmetic lens candidates and the other cosmetic lens candidates as a confidence level indicating cosmetic lens likelihood;

determining that the number of cosmetic lens candidates are each a cosmetic lens in a case where the confidence level is equal to or higher than a predetermined threshold value;

relatively align the number of cosmetic lens candidates and the other cosmetic lens candidates, and calculate a statistical value of pixel values of each of a plurality of iris image pairs, where each iris image pair includes one of the number of cosmetic lens candidates and a corresponding matching one of the other cosmetic lens candidates; and registering, in a database, at least one of the iris images determined as the cosmetic lens and features calculated using the statistical value of the pixel values of each iris image pair.

* * * * *